United States Patent
Goto et al.

(10) Patent No.: US 8,880,265 B2
(45) Date of Patent: Nov. 4, 2014

(54) HYBRID CONSTRUCTION MACHINE

(71) Applicant: Kobelco Construction Machinery Co., Ltd., Hiroshima (JP)

(72) Inventors: Naoki Goto, Hiroshima (JP); Yoichiro Yamazaki, Hiroshima (JP); Masayuki Komiyama, Hiroshima (JP); Takayuki Doi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/955,284

(22) Filed: Jul. 31, 2013

(65) Prior Publication Data

US 2014/0067176 A1 Mar. 6, 2014

(30) Foreign Application Priority Data

Aug. 30, 2012 (JP) ................................. 2012-190101

(51) Int. Cl.
*B60L 9/00* (2006.01)
*B60L 11/00* (2006.01)
(Continued)

(52) U.S. Cl.
CPC .............. *B60W 20/00* (2013.01); *E02F 9/2285* (2013.01); *E02F 9/2235* (2013.01); *B60W*
(Continued)

(58) Field of Classification Search
CPC .. B60W 2300/17; B60W 20/00; B60W 20/20
USPC .................................................... 701/22, 50
See application file for complete search history.

(56) References Cited

U.S. PATENT DOCUMENTS 6,163,135 A * 12/2000 Nakayama et al. ............ 320/150
2007/0187180 A1* 8/2007 Kagoshima et al. .......... 182/232
(Continued)

FOREIGN PATENT DOCUMENTS

EP 1 720 244 A1 11/2006
EP 2 374 945 A1 10/2011
(Continued)

OTHER PUBLICATIONS

Extended European Search Report issued Nov. 26, 2013 in Patent Application No. 13179517.1.

*Primary Examiner* — Imran Mustafa
(74) *Attorney, Agent, or Firm* — Oblon, Spivak, McClelland, Maier & Neustadt, L.L.P.

(57) ABSTRACT

Disclosed is a hybrid construction machine including: an engine, a generator-motor, a hydraulic pump, an electric storage device, a power control device which controls electric power between the generator-motor and the electric storage device, a temperature detector which determines a temperature of the electric storage device, an unload valve provided between a discharge port of the hydraulic pump and a tank, an unload-valve control device, and a relief valve. The power control device controls an electric power to be supplied from the electric storage device to the generator-motor, under abnormal circumstances where the temperature of the electric storage device is low, to a power obtained by adding an additional discharge power to a power to be supplied under normal circumstances. The unload-valve control device closes the unload valve, under abnormal circumstances. The relief valve controls the discharge pressure of the hydraulic pump to the set pressure, under abnormal circumstances.

5 Claims, 5 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *G06F 7/70* | (2006.01) | |
| *G06G 7/00* | (2006.01) | |
| *G06G 7/76* | (2006.01) | |
| *E02F 9/22* | (2006.01) | |
| *B60W 10/30* | (2006.01) | |
| *E02F 9/20* | (2006.01) | |
| *B60W 10/06* | (2006.01) | |
| *B60W 20/00* | (2006.01) | |
| *B60W 10/08* | (2006.01) | |
| *B60W 10/26* | (2006.01) | |

(52) U.S. Cl.
CPC ...... 10/30 (2013.01); *E02F 9/2075* (2013.01); *B60W 10/06* (2013.01); *E02F 9/2296* (2013.01); *B60W 10/08* (2013.01); *E02F 9/2091* (2013.01); *B60W 10/26* (2013.01); *Y10S 903/93* (2013.01)
USPC .............................. 701/22; 701/50; 903/930

(56) References Cited

U.S. PATENT DOCUMENTS

| | | |
|---|---|---|
| 2009/0301075 A1* | 12/2009 | Morinaga et al. ............... 60/459 |
| 2010/0001583 A1* | 1/2010 | Ichikawa ..................... 307/10.1 |
| 2011/0254513 A1 | 10/2011 | Kagoshima |
| 2011/0270481 A1 | 11/2011 | Koga et al. |
| 2012/0046812 A1* | 2/2012 | Sujan et al. ..................... 701/22 |
| 2013/0035820 A1 | 2/2013 | Kawasaki et al. |

FOREIGN PATENT DOCUMENTS

| | | |
|---|---|---|
| EP | 2 377 710 A2 | 10/2011 |
| JP | 2010-127271 | 6/2010 |
| WO | WO 2011/142187 A1 | 11/2011 |

\* cited by examiner

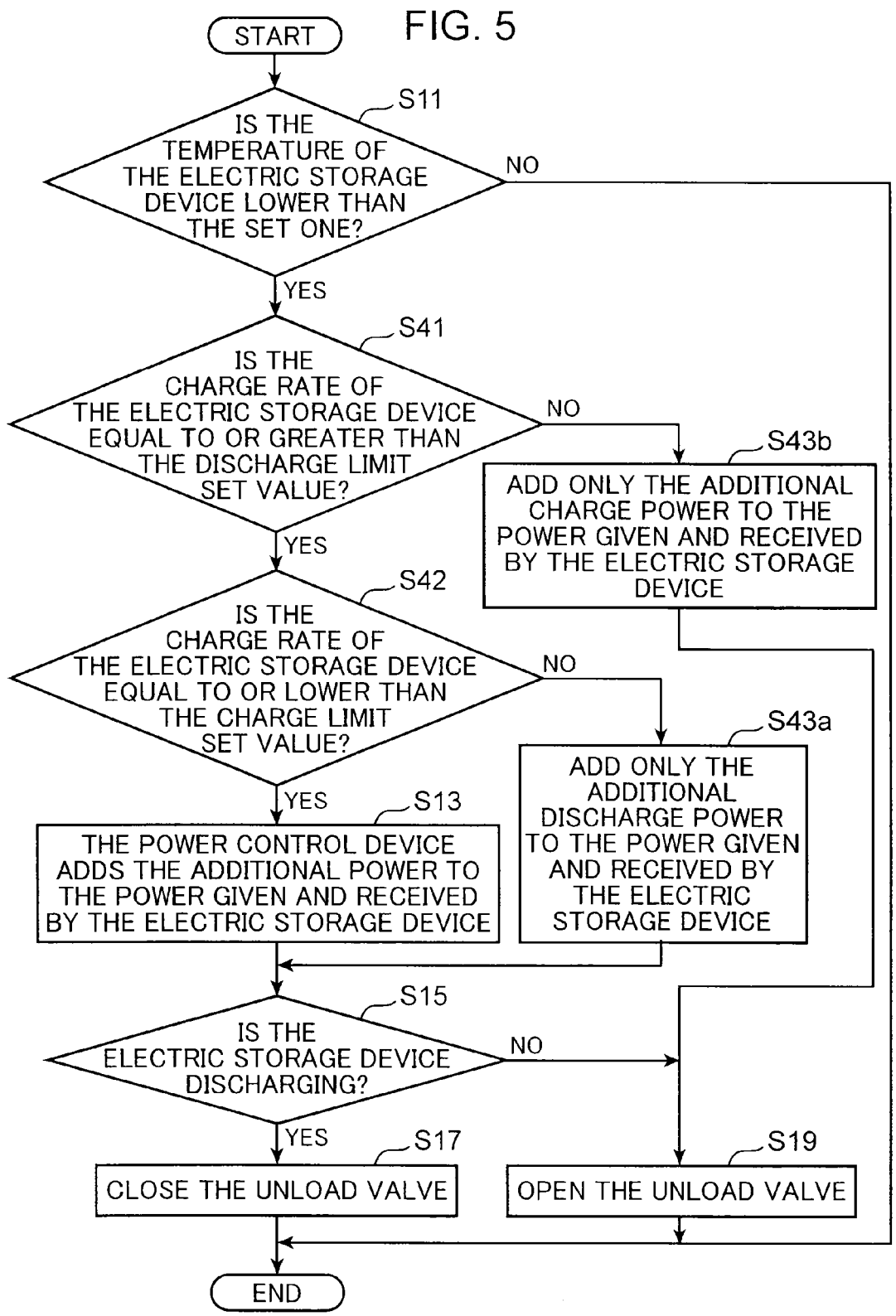

HYBRID CONSTRUCTION MACHINE

BACKGROUND OF THE INVENTION

1. Technical Field

The present invention relates to a hybrid construction machine.

2. Related Art

Conventionally, a hybrid construction machine is known provided with an engine that generates motive power, a generator-motor that assists the engine, and an electric storage device connected to the generator-motor. The electric storage device includes a battery having an internal resistance which becomes larger in a low-temperature state compared to a normal-temperature state to thereby make the charging and discharging performance of the electric storage device consequently decline. Specifically, when the electric storage device is in a low-temperature state, the discharge current falls compared to a normal-temperature state, thus making it necessary to raise the charging voltage.

Under the circumstances, Japanese Patent Application Publication No. 2010-127271 discloses a method for warming an electric storage device. This method includes operating the generator-motor to charge and discharge the electric storage device when the temperature of the electric storage device is lower than a predetermined temperature, thereby causing the electric storage device to generate heat.

This method, however, involves the operation of the generator-motor as an electric motor according to the discharge from the electric storage device for warm-up, which may cause an excess of the assist power which the generator-motor outputs, that is, the power for assisting the engine. The excess assist power may excessively increase the rotational speed of a hydraulic pump connected to the engine and the generator-motor, for example, to a level exceeding the permitted speed, thus generating possibility of faults in the hydraulic pump or loss of life of the engine.

SUMMARY OF THE INVENTION

The object of the present invention is to provide a hybrid construction machine comprising an engine, a generator-motor and an electric storage device, the hybrid construction machine being capable of warming up the electric storage while restraining motive power for assisting the engine from excess.

The hybrid construction machine provided by the present invention includes: an engine; a generator-motor which has a function as an electric motor generating motive power for assisting the engine and a function as a generator generating electric power; a hydraulic pump which is driven by the engine and the generator-motor; an electric storage device which is connected to the generator-motor so as to be enabled to store the electric power generated by the generator-motor and supply the electric power to the generator-motor; an electric-power control device which controls the electric power given and received between the generator-motor and the electric storage device; a temperature detector which detects a temperature of the electric storage device; an unload valve provided between a discharge port of the hydraulic pump and a tank; an unload-valve control device which controls opening and closing of the unload valve; and a relief valve provided between the discharge port of the hydraulic pump and having a set pressure which is predetermined. The power control device controls the electric power to be supplied from the electric storage device to the generator-motor to a power obtained by adding an additional discharge power to a power to be supplied under normal circumstances, under abnormal circumstances where the temperature of the electric storage device is lower than a predetermined set temperature. The unload-valve control device closes the unload valve under the abnormal circumstances. The relief valve controls the discharge pressure of the hydraulic pump to adjust the discharge pressure to the set pressure, under the abnormal circumstances.

BRIEF DESCRIPTION OF THE DRAWINGS

FIG. 2 is a flowchart showing a first example of a calculation and control operation which are carried out by the controller shown in FIG. 1, and the like;

FIG. 3 is a flowchart showing a second example of a calculation and control operation which are carried out by the controller shown in FIG. 1, and the like;

FIG. 4 is a flowchart showing a third example of a calculation and control operation which are carried out by the controller shown in FIG. 1, and the like; and FIG. 5 is a flowchart showing a fourth example of a calculation and control operation which are carried out by the controller shown in FIG. 1, and the like.

DESCRIPTION OF THE PREFERRED EMBODIMENTS

Here is described an embodiment relating to the present invention with reference to FIG. 1 to FIG. 5.

Figure 1:
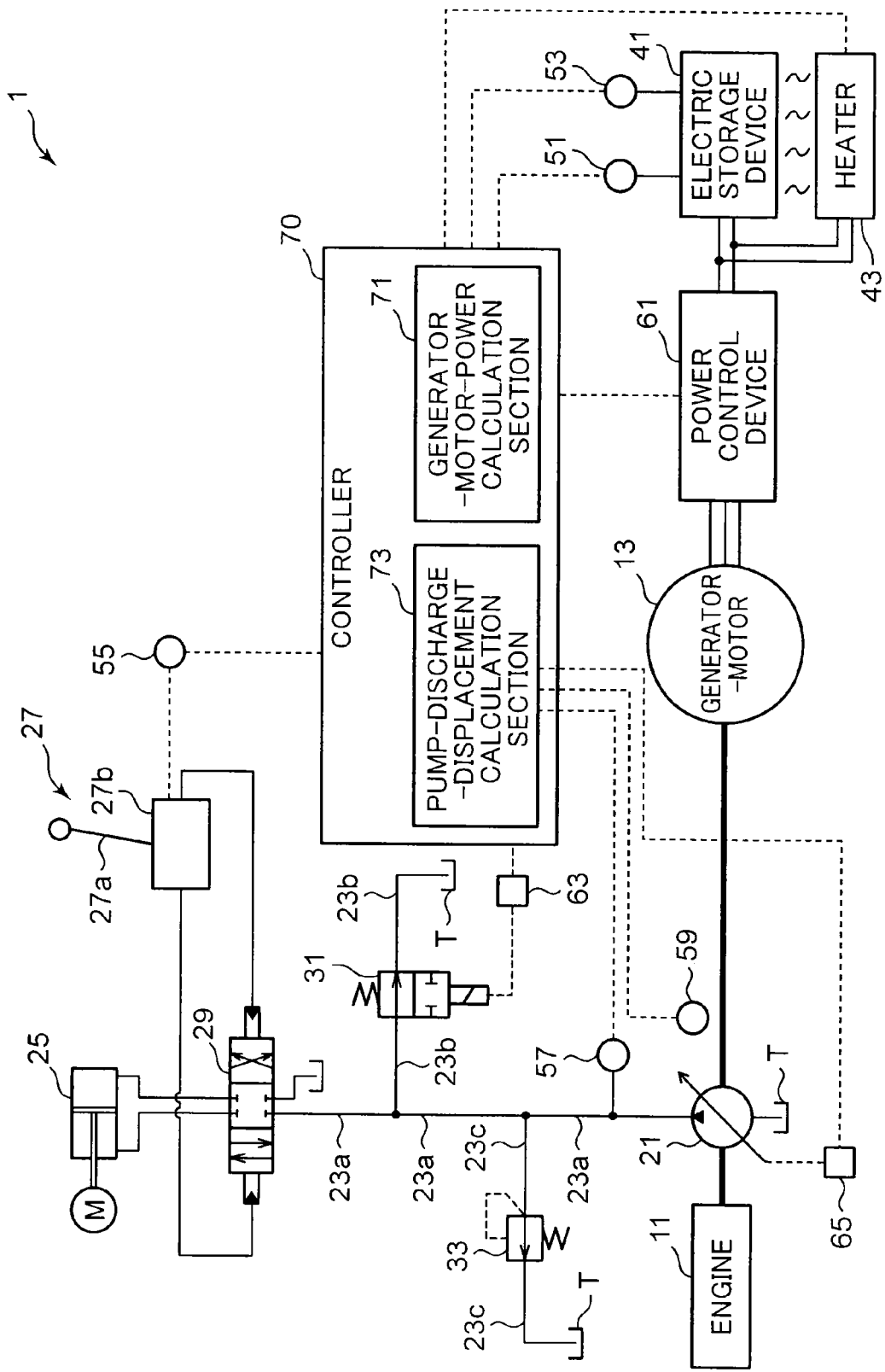
FIG. 1 is a diagram including a hydraulic circuit and block to indicate constituent elements of a hybrid construction machine relating to an embodiment of the present invention.

FIG. 1 is a diagram showing respective constituent elements of a hybrid construction machine relating to an embodiment of the present invention. This hybrid construction machine includes an engine 11, a generator-motor 13, a hydraulic circuit and a plurality of electrical devices. The generator-motor 13 is connected to an output shaft of the engine 11, being capable of operating as both of an electric motor which generates motive power for assisting the engine 11 and a generator which generates electric power.

The plurality of hydraulic devices include a hydraulic pump 21, a first fluid path 23a, a second fluid path 23b, a third fluid path 23c, an actuator 25, an operation device 27, a control valve 29, an unload valve 31 and a relief valve 33.

The hydraulic pump 21 is driven by the engine 11 and the generator-motor 13. The hydraulic pump 21 is connected to the output shaft of the engine 11 and is connected to an input/output shaft of the generator-motor 13. The hydraulic pump 21 shown in FIG. 1 is a variable displacement one, but may also be constituted by a fixed-displacement type of hydraulic pump.

The first fluid path 23a interconnects the hydraulic pump 21 and the actuator 25. The second fluid path 23b and the third fluid path 23c branch off from the first fluid path 23a between the hydraulic pump 21 and the control valve 29, being connected to a tank T.

The actuator 25 is, for example, a hydraulic cylinder or a hydraulic motor for actuating an attachment M. In the case of an excavator as the construction machine, the attachment M is constituted, for example, by a boom, an arm, a bucket, and the like.

The operation device 27 is to operate the actuator 25. The operation device 27 shown in FIG. 1 has an operation lever 27a provided inside a driver's cab to be operable by an operator and a remote control valve 27b which outputs a pilot pressure in accordance with the operation of the operation lever 27a.

The control valve 29 is provided between the hydraulic pump 21 and the actuator 25, specifically, partway of the first fluid path 23a, and is connected to the tank T and the operation lever 27a. The control valve 29 is operated so as to control flow volume and direction of hydraulic fluid supplied to the actuator 25 in accordance with the operation of the operation lever 27a.

The unload valve 31 is provided between the discharge port of the hydraulic pump 21 and the tank T, specifically, in the second fluid path 23b, to operate so as to open and close the second fluid path 23b. The unload valve 31 is opened to permits discharged fluid from the hydraulic pump 21 to flow with substantially no load to the tank T via the second fluid path 23b, and is closed to shut off the second fluid path 23b.

The relief valve 33 is a pressure control valve provided between the discharge port of the hydraulic pump 21 and the tank T, specifically, in the third fluid path 23c, to control the discharge pressure of the hydraulic pump 21 to a predetermined set pressure. The relief valve 33 is closed when the hydraulic pressure on the intake side thereof is equal to or less than a set pressure while opened when the hydraulic pressure on the intake side is greater than the set pressure.

The plurality of electrical devices include an electric storage device 41, a heater 43, a plurality of detectors, a plurality of control devices, and a controller 70.

The electric storage device 41 includes a battery and is connected to the generator-motor 13 so as to give to and receive from the generator-motor 13 an electrical power. The electric storage device 41 generates heat upon discharge and charge thereof.

The heater 43 is operated by supply of power so as to heat the electric storage device 41 from the exterior of the electric storage device 41. The heater 43 is disposed about the electric storage device 41.

The plurality of detectors include a temperature detector 51, a charge-rate detector 53, an operation-state detector 55, a pump-discharge-pressure detector 57, and a pump-speed detector 59. The temperature detector 51 determines a temperature of the electric storage device 41. The charge-rate detector 53 determines a charge rate of the electric storage device 41. The operation-state detector 55 detects whether or not the operation device 27 is operated, for example, by monitoring the pilot pressure output from the operation device 27. The pump-discharge-pressure detector 57 determines the discharge pressure of the hydraulic pump 21, in this embodiment, the pressure on the upstream side of the unload valve 31 and the relief valve 33. The pump speed detector 59 determines the rotational speed of the hydraulic pump 21 directly or indirectly. The pump speed detector 59 may calculate the speed of the hydraulic pump 21, on the basis of information about the speed of the engine 11.

The plurality of control devices include a power control device 61, an unload-valve control device 63 and a pump-discharge-displacement control device 65. The power control device 61 controls the electric power given and received between the generator-motor 13 and the electric storage device 41. The power control device 61 in the present embodiment includes an inverter circuit and a converter circuit. The unload-valve control device 63 controls the opening and closing operation of the unload valve 31, in other words, switches the opening and closing of the unload valve 31. The pump-discharge-displacement control device 65 controls the discharge displacement of the hydraulic pump 21, for example, by varying the tilt angle of the pump, for example.

The controller 70 carries out various computing processes and the like. The controller 70 receives respective inputs of signals generated by the detectors 51, 53, 55, 57 and 59, respectively, in other words, the various determination results. The controller 70 outputs respective commands (signals) to the control devices 61, 63, 65. The controller 70 includes a generator-motor-power calculation section 71 and a pump-discharge-displacement calculation section 73.

The generator-motor-power calculation section 71 calculates a motive power generated by the generator-motor 13 on the basis of the electric power which is controlled by the power control device 61. For instance, the generator-motor-power calculation section 71 calculates the motive power generated by the generator-motor 13, from the product of the electric power controlled by the power control device 61 and the efficiency of the generator-motor 13. In the description given below, however, neither the efficiency of the generator-motor 13 nor the efficiency of the hydraulic pump 21 is particularly mentioned.

Figure 2:
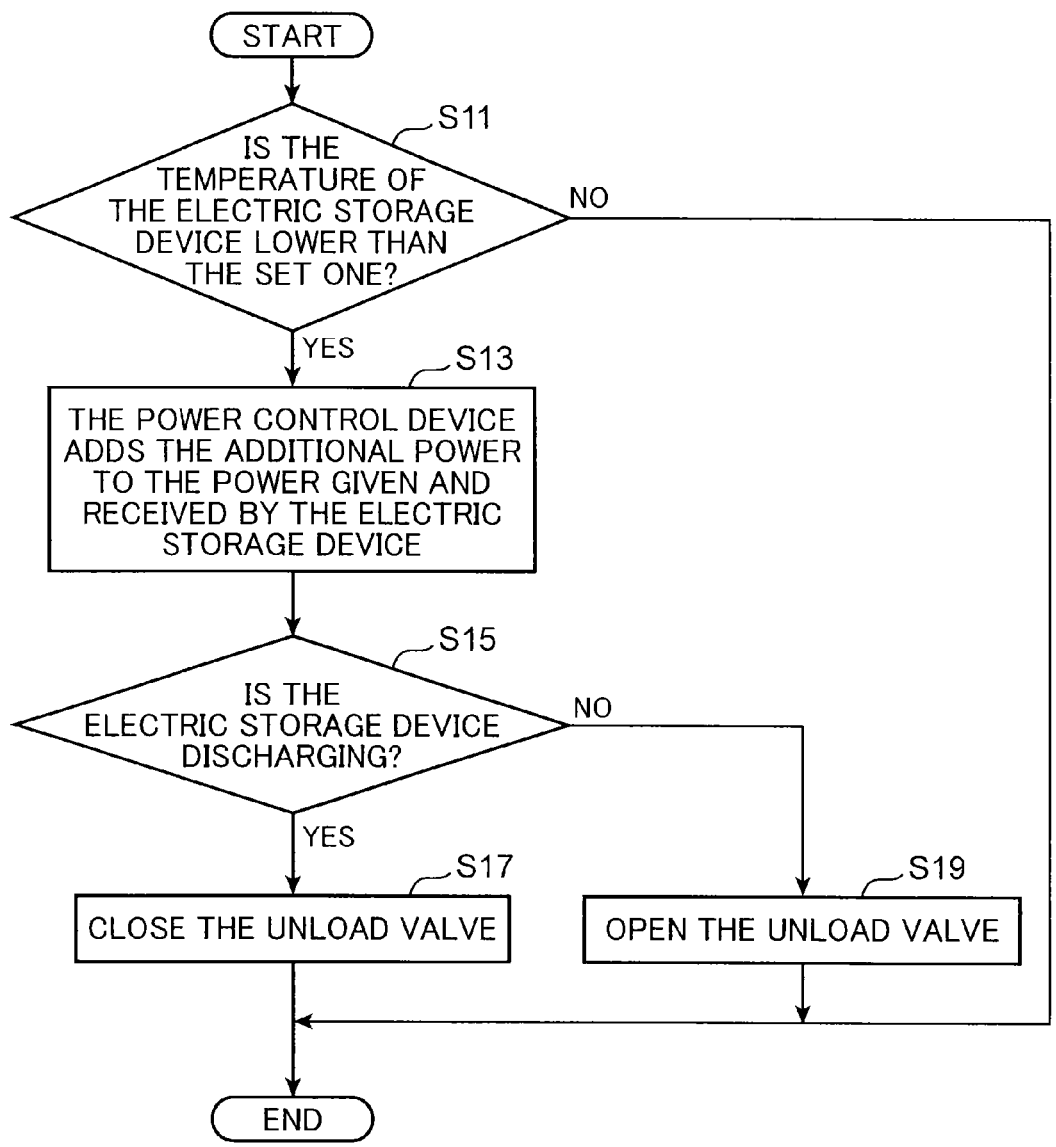

FIG. 2 is a flowchart showing a first example of a calculation and control operation performed by the control devices 61, 63, 65 and the controller 70.

In step S11, the controller 70 judges whether the temperature of the electric storage device 41 as determined by the temperature detector 51 is lower than a predetermined set temperature. Desirably, for example, the controller 70 previously store the set temperature.

If the determined temperature of the temperature detector 51 is lower than the set temperature (YES at step S11), in other words, in abnormal circumstances, the operation from step S13 onwards is carried out. If the temperature determined by the temperature detector 51 is equal to or greater than the set temperature (NO), the following operations for "normal circumstances" are performed.

The operations performed by the electric storage device 41 in the "normal circumstances" includes (a) a charging operation and (b) a discharging operation. When the electric storage device 41 performs (a) a charging operation, the generator-motor 13 driven by the engine 11 generates electric power, which is supplied to the electric storage device 41 via the power control device 61. When the electric storage device 41 performs (b) a discharging operation, the generator-motor 13 and the engine 11 drive the hydraulic pump 21, while the power control device 61 controls the power supplied from the electric storage device 41 to the generator-motor 13. This control is performed, for example, so as to make the sum of the motive power of the engine 11 and the motive power of the generator-motor 13 be equal to the motive power of the hydraulic pump 21 under hydraulic load (the motive power of the hydraulic pump 21 to which a hydraulic load is applied).

Under the "abnormal circumstances" described above, the electric power given and received between the electric storage device 41 and the generator-motor 13 is increased, in step S13, compared to the electric power under normal circumstances. Specifically, the power control device 61 sets the power obtained by adding the "additional discharge power ΔE1" to the electric power to be supplied under normal circumstances, as the power to be supplied to the generator-motor 13 from the electric storage device 41, when the electric storage device 41 is charged, while the power control device 61 sets the power obtained by adding the "additional charge power ΔE2" to the electric power to be supplied under normal circumstances, as the power to be supplied to the electric storage device 41 from the generator-motor 13, when charging the electric storage device 41.

Next, in step S15, the controller 70 judges whether or not the electric storage device 41 is discharging.

If the electric storage device 41 is discharging (YES at step S15), the controller 70 causes the unload-valve control device 63 to close the unload valve 31 (step S17). The discharge pressure of the hydraulic pump 21 is thereby increased until reaching the set pressure of the relief valve 33. In other words, the relief valve 33 controls the discharge pressure of the hydraulic pump 21 to the set pressure of the relief valve 33 or a pressure substantially equal to same. In this embodiment, the relief valve 33 controls the hydraulic pressure on the upstream side of the unload valve 31 and the relief valve 33 in the second fluid path 23b and the third fluid path 23c. This increases the required motive power of the hydraulic pump 21, thus cancelling out the excessive assist power (surplus power) of the generator-motor 13 supplied to the engine 11 as a result of the addition of the additional discharge power $\Delta E1$ (step S13). The magnitude of the set pressure of the relief valve 33 is previously set so as to allow the above cancelling out action to be sufficiently performed.

If the electric storage device 41 is not discharging (NO at step S15), the controller 70 causes the unload-valve control device 63 to close the unload valve 31 (step S19). As a result of this, the hydraulic fluid discharged by the hydraulic pump 21 is returned to the tank T, with substantially no load, via the unload valve 31.

As described above, the hybrid construction machine relating to this embodiment includes: an engine 11, a generator-motor 13, a hydraulic pump 21 which is driven by the engine 11 and the generator-motor 13, an electric storage device 41 connected to the generator-motor 13, a power control device 61 which controls the electric power given and received between the generator-motor 13 and the electric storage device 41, a temperature detector 51 which determines a temperature of the electric storage device 41, an unload valve 31 provided between the discharge port of the hydraulic pump 21 and the tank T, an unload-valve control device 63 which controls opening and closing of the unload valve 31, and a relief valve 33 provided between the discharge port of the hydraulic pump 21 and the tank T and having a predetermined set pressure. Under "abnormal circumstances" where the temperature of the electric storage device 41 (the temperature determined by the temperature detector 51) is lower than the predetermined set temperature, the power control device 61 controls the power supplied to the generator-motor 13 from the electric storage device 41 to the power obtained by adding the additional discharge power $\Delta E1$ (step S13 in FIG. 2) to the power to be supplied under "normal circumstances", while the unload-valve control device 63 closes the unload valve 31 (step S17 in FIG. 2), and the relief valve 33 controls the discharge pressure of the hydraulic pump 21 to the set pressure of the relief valve 33.

The addition of the additional discharge power $\Delta E1$ performed by the power control device 61 makes it possible to increase the amount of self-heating of the electric storage device 41 to thereby accelerate the warm-up thereof. Closing the unload valve 31 performed by the unload-valve control device 63 and the control of the discharge pressure of the hydraulic pump 21 performed by the relief valve 33 increases the load applied to the pump 21 compared to a case of not closing the unload valve 31, thereby restraining the assist power of the generator-motor 13 to the engine 11 under "abnormal circumstances" from excess. In short, there is suppressed an increase in the speed of the hydraulic pump 21 and the engine 11 due to an increase in the motive power supplied to the hydraulic pump 21 by the addition of the additional discharge power $\Delta E1$. This makes it possible to suppress loss of life of the engine 11 and faults in the hydraulic pump 21 due to excessive increase in the speed of the pump and engine.

Besides, in the hybrid construction machine including the actuator 25 operated by the supply of hydraulic fluid discharged by the hydraulic pump 21 and the operation device 27 operated in order to move the actuator 25, closing the unload valve 31 and increasing the load applied to the hydraulic pump 21 under "abnormal circumstances" as described above enables the electric storage device 41 to discharge and enables the additional discharge power $\Delta E1$ to be added, even with no operation of the operation device 27.

The reason for this is as follows. In a conventional construction machine, in the case of no operation of the operation device, where no load is applied to the hydraulic pump and thus there is no requirement of assisting the engine power by the generator-motor, the assist, if were performed in the case, could permit an excessive assist power to be generated, which does not allow the discharge power from the electric storage device 41 to be supplied to the generator-motor 13. Besides, even under "normal circumstances", if the operation device is not operated, the assist is not required and therefore the discharge power of the electric storage device 41 is set, for example, to zero. On the other hand, in the present embodiment in which the unload valve 31 is closed under "abnormal circumstances" to enable load to be applied to the hydraulic pump 21, the assist described above is possible, in other words, discharge from the electric storage device 41 is possible, even with no operation of the operation device 27; therefore, the additional discharge power $\Delta E1$ can be added to the discharge of the electric storage device 41 under "normal circumstances" (for example, 0). Hence, even in the case of no operation of the operation device 27, the electric storage device 41 can discharge to warm-up itself.

Figure 3:
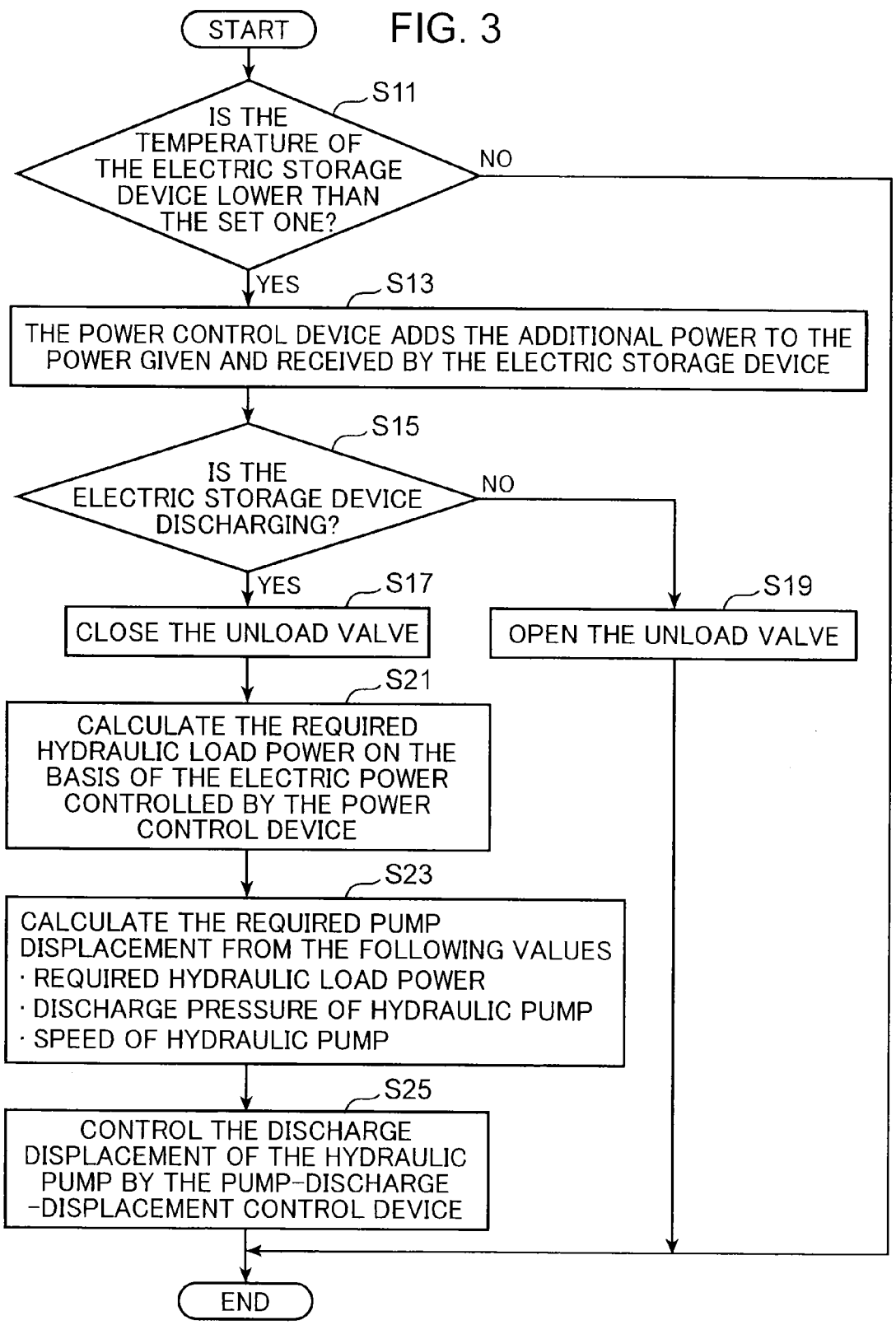

FIG. 3 is a flowchart showing a second example of a calculation and control operation performed by the control devices 61, 63, 65 and the controller 70. The operation according to this second example involves sequentially performing, in addition to the operation of the first example shown in FIG. 2, the steps S21, S23 and S25 indicated in FIG. 3, after the step S17 under "abnormal circumstances". This operation can be realized when the controller 70 includes the pump power calculation section 73 shown in FIG. 1.

In step S21, there is calculated a pump additional motive power $\Delta P2$ of the hydraulic pump 21 which is required for cancelling out excessive motive power produced by the engine 11 and the generator-motor 13. This calculation is carried out as follows. The generator-motor-power calculation section 71 calculates a generator-motor additional motive power $\Delta P1$, which is an additional amount of motive power of the generator-motor 13 corresponding to the additional discharge power $\Delta E1$. On the basis of the generator-motor additional motive power $\Delta P1$, the pump power calculation section 73 calculates a pump additional motive power $\Delta P2$, which is an additional amount of the motive power of the hydraulic pump 21 corresponding to the generator-motor additional motive power $\Delta P1$.

In step S23, calculated is an additional discharge displacement $\Delta q$ (described below), which is required for cancelling out as described, of the hydraulic pump 21. Specifically, the pump power calculation section 73 calculates the additional discharge displacement $\Delta q$ on the basis of the pump additional motive power $\Delta P2$ (step S21). The additional discharge displacement $\Delta q$ is an additional amount of the discharge displacement of the hydraulic pump 21 which is required for adding the pump additional motive power $\Delta P2$ to the motive power of the hydraulic pump 21. The additional discharge displacement Δq is calculated from the pump additional motive power ΔP2, the discharge pressure of the hydraulic pump 21 which is determined by the pump discharge pressure detector 57, and the speed of the hydraulic pump 21 which is determined by the pump speed detector 59. Specifically, the value of Δq is determined by Δq=ΔP2/(discharge pressure× pump speed).

In step S25, the pump-discharge-displacement control device 65 controls the discharge displacement of the hydraulic pump 21 in accordance with the additional discharge displacement Δq (see step S23).

The calculation and control operation according to this second example is achieved by the following composition: the hydraulic pump 21 is a variable-displacement pump; the hybrid construction machine includes a pump-discharge-pressure detector 57 which determines a discharge pressure of the hydraulic pump 21, a pump speed detector 59 which determines the rotational speed of the hydraulic pump 21, a pump-discharge-displacement control device 65 which controls the discharge displacement of the hydraulic pump 21, a pump-discharge-displacement calculation section 73 and a generator-motor-power calculation section 71 which calculates the motive power of the generator-motor 13 on the basis of the electric power controlled by the power control device 61; the generator-motor-power calculation section 71 calculates the generator-motor additional motive power ΔP1 (the motive power of the generator-motor 13 corresponding to the additional discharge power ΔE1); the pump motive power calculation section 73 calculates the pump additional motive power ΔP2 (the motive power of the hydraulic pump 21 corresponding to the generator-motor additional motive power ΔP1) and the additional discharge displacement Δq (the discharge displacement of the hydraulic pump 21 required for adding to the motive power of the hydraulic pump 21 an amount of motive power corresponding to the pump additional motive power ΔP2); the pump-discharge-displacement control device 65 controls the discharge displacement of the hydraulic pump 21 on the basis of the additional discharge displacement Δq.

Thus, in this second example, the magnitude of the load applied to the hydraulic pump 21 is accurately controlled in accordance with the additional electric power. If excessively large load is applied to the hydraulic pump 21, the rotational speed of the engine 11 connected to the hydraulic pump 21 falls down and the fuel consumption of the engine 11 may be deteriorated; meanwhile, the calculation and control operation according to the second example allows the load of the hydraulic pump 21 to be prevented from excessive increase.

Figure 4:
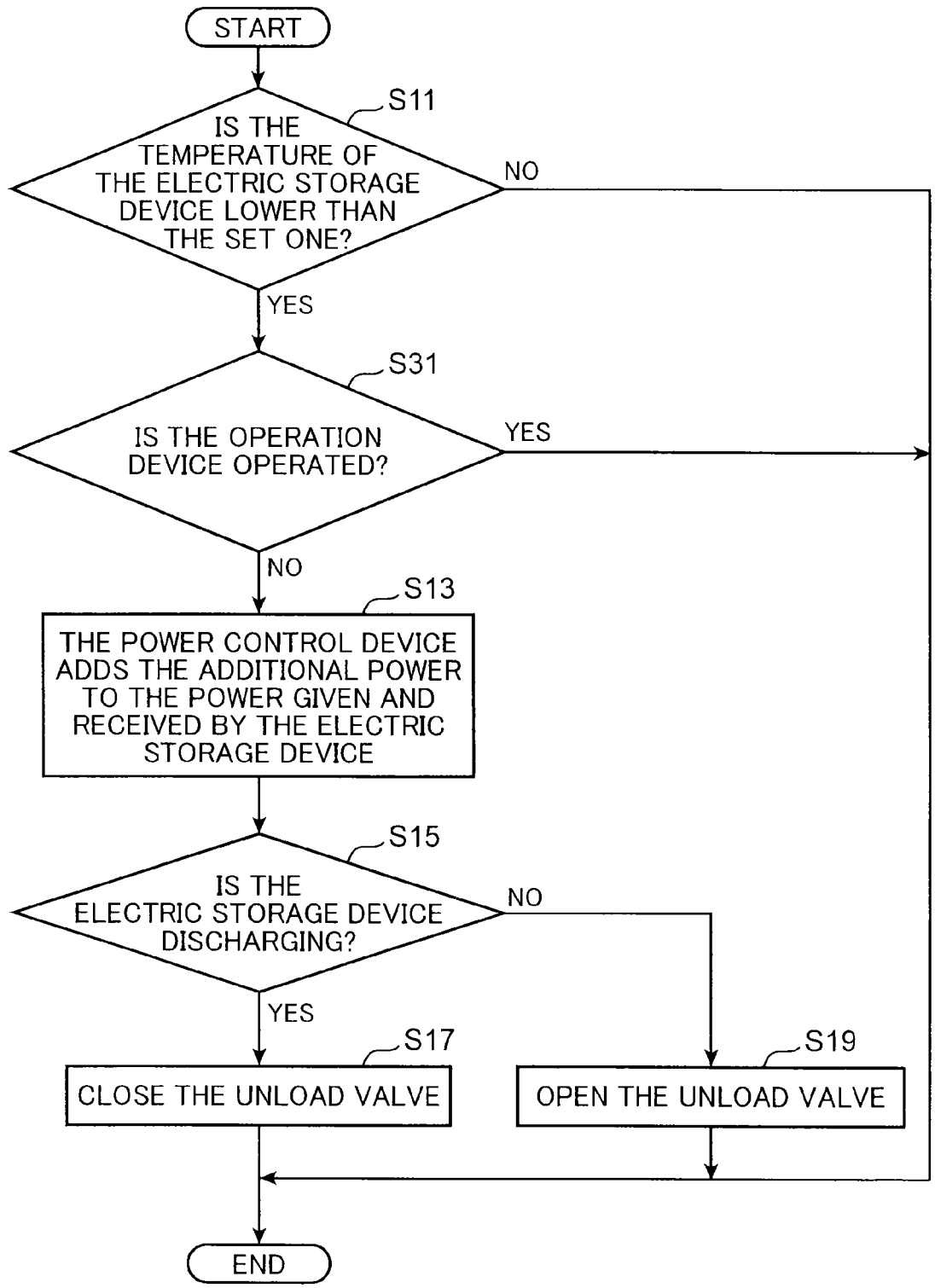

FIG. 4 is a flowchart showing a third example of a calculation and control operation performed by the control devices 61, 63, 65 and the controller 70. The operation according to this third example involves carrying out step S31 after step S11, in addition to the operation of the first example shown in FIG. 2. In step S31, the operation-state detector 55 judges whether or not the operation device 27 is operated. If the operation device 27 is operated (YES in step S31), the controller 70 carries out no addition of the electric power in step S13. If the operation device 27 is not operated (NO in step S31), the controller 70 performs the addition of the additional discharge power ΔE1 or the additional charge power ΔE2, in step S13, similarly to the first example.

The operation according to this third example is achieved by the following composition: the hybrid construction machine includes an actuator 25 which is operated by supply of hydraulic fluid discharged from the hydraulic pump 21, an operation device 27 which is operated in order to move the actuator 25 and an operation-state detector 55 which detects whether or not the operation device 27 is operated; the power control device 61 performs addition of the additional discharge power ΔE1 only when the operation-state detector 55 has detected no operation of the operation device 27. Thus restricting the addition of the additional discharge power ΔE1 to situations where the operation device 27 is not operated prevents the operation of the actuator 25 by the operating lever 27a from being adversely affected by the addition of the additional discharge power ΔE1. As an example of this adverse effect, it exists that sudden change in the load applied to the hydraulic pump 21 brings the operating speed of the actuator 25 into sudden change.

FIG. 5 is a flowchart showing a fourth example of a calculation and control operation performed by the control devices 61, 63, 65 and the controller 70. The operation according to this fourth example involves carrying out, in addition to the operation of the first example which is shown in FIG. 2, the steps of S41, S42, S43a and S43b, after the step S11.

In step S41, the controller 70 judges whether or not the charge rate of the electric storage device 41 is equal to or more than a predetermined discharge limit set value. The charge rate of the electric storage device 41 is determined by the charge rate detector 53. If the charge rate is equal to or more than the discharge limit set value (YES in step S41), step S42 is carried out; if the charge rate is lower than the discharge limit setting (NO in step S41), step S43b is carried out.

In step S42, the controller 70 judges whether or not the charge rate of the electric storage device 41 is equal to or less than a predetermined charge limit set value. If the charge rate is equal to or less than the charge limit setting (YES at step S42), in other words, if the charge rate is between the charge limit set value and the discharge limit set value, step S13 is carried out; if the charge rate is more than the charge limit set value (NO at step S42), step S43a is carried out. In step S43a, the power control device 61 restricts addition of the additional charge power ΔE2 and only carries out addition of the additional discharge power ΔE1. Step S15 is thereafter carried out. In step S43b, the power control device 61 restricts addition of the additional discharge power ΔE1 and only carries out addition of the additional charge power ΔE2. Step S19 is thereafter carried out.

The operation according to this fourth example is achieved by the following composition: the hybrid construction machine includes a charge rate detector 53 which determines a charge rate of the electric storage device 41; the power control device 61 controls the power supplied from the generator-motor 13 to the electric storage device 41, under "abnormal circumstances", to the power obtained by adding the additional charge power ΔE2 to the power to be supplied under "normal circumstances"; the power control device 61 controls the power supplied from the electric storage device 41 to the generator-motor 13, under "abnormal circumstances", to the power obtained by adding the additional discharge power ΔE1 to the power to be supplied under "normal circumstances", similarly to the first example; the power control device 61 restricts addition of the additional charge power ΔE2 when the charge rate of the electric storage device 41 is higher than a predetermined charge limit set value; the power control device 61 restricts addition of the additional discharge power ΔE1 when the charge rate of the electric storage device 41 is lower than a predetermined discharge limit set value.

The operation according to this fourth example can prevent the electric storage device 41 from excessive discharging or excessive charging.

Moreover, in the case of the hybrid construction machine including the heater 43 disposed about the electric storage device 41, it is desirable to carry out the operation according to the following fifth example. The power control device 61 controls the power supplied from the generator-motor 13 to the electric storage device 41, under "abnormal circumstances," to the power obtained by adding the additional charge power ΔE2 to the power to be supplied under "normal circumstances". The power control device 61 controls the power supplied from the electric storage device 41 to the generator-motor 13, under "abnormal circumstances", to the power obtained by adding the additional discharge power ΔE1 to the power to be supplied under "normal circumstances", similarly to the first example. The heater 43 is operated by electric power supplied from the electric storage device 41, when the additional discharge power ΔE1 is supplied from the electric storage device 41 to the generator-motor 13, while operated by electric power supplied from the generator-motor 13, when the additional charge power ΔE2 is supplied from the generator-motor 13 to the electric storage device 41. According to this operation, the electric storage device 41 is self-heated by giving or receiving the additional discharge power ΔE1 or the additional charge power ΔE2, and also heated from the exterior by the heater 43. The electric storage device 41 is thus warmed up more quickly.

In the present invention, the embodiment described above can be modified in various ways. For example, the interconnections of the respective compositional elements shown in FIG. 1 (for example, the connections between the hydraulic devices included in the hydraulic circuit and the plurality of electrical devices), or the sequence of the respective steps shown in FIG. 2 to FIG. 5, may be modified appropriately. Moreover, if only a part of the operations according to the first to fifth examples are carried out, for example, it is possible to omit the constituent elements which are not necessary for these operations, of the constituent elements shown in FIG. 1.

As described above, the present invention provides a hybrid construction machine including an engine, a generator-motor and an electric storage device, the hybrid construction machine being capable of warming up the electric storage device while restraining motive power for assisting the engine from excess. The hybrid construction machine provided by the present invention includes: an engine; a generator-motor which has a function as an electric motor generating motive power for assisting the engine and a function as a generator generating electric power; a hydraulic pump which is driven by the engine and the generator-motor; an electric storage device which is connected to the generator-motor so as to be enabled to store the electric power generated by the generator-motor and supply the electric power to the generator-motor; an electric-power control device which controls the electric power given or received between the generator-motor and the electric storage device; a temperature detector which determines a temperature of the electric storage device; an unload valve provided between a discharge port of the hydraulic pump and a tank; an unload-valve control device which controls opening and closing of the unload valve; and a relief valve provided between the discharge port of the hydraulic pump and having a set pressure which is predetermined. The power control device controls the electric power to be supplied from the electric storage device to the generator-motor, under abnormal circumstances where the temperature of the electric storage device is lower than a predetermined set temperature, to a power obtained by adding an additional discharge power to a power to be supplied under normal circumstances. The unload-valve control device closes the unload valve under the abnormal circumstances. The relief valve controls the discharge pressure of the hydraulic pump, under the abnormal circumstances, to adjust the discharge pressure to the set pressure.

In this hybrid construction machine, the addition of the additional discharge power by the power control device makes it possible to increase the amount of self-heating of the electric storage device to thereby accelerate warming up thereof. Closing the unload valve by the unload-valve control device and the control of the discharge pressure of the hydraulic pump by the relief valve increases the load applied to the pump compared to a case of not closing the unload valve, thereby restraining the assist power from the generator-motor to the engine under "abnormal circumstances" from excess. Thus, suppressed is an increase in the rotational speed of the hydraulic pump and the engine due to the increase in the motive power supplied to the hydraulic pump as a result of adding the additional discharge power. This enables loss of life of the engine and faults in the hydraulic pump due to excessive increase in the speed of the pump and engine to be suppressed.

In the present invention, it is preferable that: the hydraulic pump is a variable displacement pump; the hybrid construction machine further includes a pump discharge pressure detector which determines a discharge pressure of the hydraulic pump, a pump rotational speed detector which determines a rotational speed of the hydraulic pump, a pump-discharge-displacement control device which controls a discharge displacement of the hydraulic pump, a pump-discharge-displacement calculation section, and a generator-motor-power calculation section which calculates a motive power of the generator-motor on the basis of an electric power controlled by the power control device; the generator-motor power calculation section calculates a generator-motor additional power which is a motive power of the generator-motor corresponding to the additional discharge power; the pump power calculation section calculates a pump additional power which is a motive power of the hydraulic pump corresponding to the generator-motor additional power; the pump power calculation section calculates an additional discharge displacement which is a discharge displacement of the hydraulic pump required for adding to the motive power of the hydraulic pump an amount corresponding to the pump additional power, and the pump-discharge-displacement control device controls the discharge displacement of the hydraulic pump on the basis of the additional discharge displacement.

In this hybrid construction machine, the magnitude of the load applied to the hydraulic pump is accurately controlled in accordance with the additional power. Excessive increase in the load on the hydraulic pump could decline the speed of the engine connected to the hydraulic pump to deteriorate the engine fuel consumption; however, the calculation and control operation described above prevents the load on the hydraulic pump from excessive increase.

The hybrid construction machine according to the present invention, preferably, further includes an actuator which is operated by supply of hydraulic fluid discharged from the hydraulic pump, an operation device which is operated in order to move the actuator, and an operation-state detector which detects whether or not the operation device is operated, wherein the power control device carries out the addition of the additional discharge power only when the operation-state detector detects no operation of the operation device. Thus increasing the load on the hydraulic pump by adding the additional discharge power only when the operation device is not being operated in a hybrid construction machine comprising an actuator and an operation apparatus as described above allows the addition of the discharge from the electric storage device and the additional discharge power to be performed, even if the operation device is not being operated.

The hybrid construction machine according to the present invention, preferably, further includes a charge rate detector which determines a charge rate of the electric storage device, wherein: the power control device controls the electric power to be supplied from the generator-motor to the electric storage device under the abnormal circumstances to a power obtained by adding an additional charge power to the power to be supplied under normal circumstances; the power control device restricts the addition of the additional charge power when the charge rate is higher than a predetermined charge limit set value; and the power control device restricts the addition of the additional discharge power when the charge rate is lower than a predetermined discharge limit set value. These restrictions of respective additions of the additional discharge power and the additional charge power allows the electric storage device to be prevented from excessive discharge and excessive charge.

The hybrid construction machine according to the present invention, preferably, further includes a heater disposed about the electric storage device, wherein the power control device controls an electric power to be supplied from the generator-motor to the electric storage device, under the abnormal circumstances to a power obtained by adding an additional charge power to a power to be supplied under normal circumstances; and the heater is operated by electric power supplied from the electric storage device when the additional discharge power is supplied from the electric storage device to the generator-motor, while the heater is operated by electric power supplied from the generator-motor when the additional charge power is supplied from the generator-motor to the electric storage device. The heater, which heats the electric storage device externally, in addition to the self-heating of the electric storage device based on giving and receiving the additional discharge power or the additional charge power, allows the electric storage device to be warmed up more rapidly.

This application is based on Japanese Patent application No. 2012-190101 filed in Japan Patent Office on Aug. 30, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A hybrid construction machine, comprising:
an engine;
a generator-motor which has a function as an electric motor generating motive power for assisting the engine and a function as a generator generating electric power;
a hydraulic pump which is driven by the engine and the generator-motor to discharge hydraulic fluid;
an electric storage device which is connected to the generator-motor so as to be enabled to store electric power generated by the generator-motor and supply electric power to the generator-motor;
an electric-power control device which controls electric power given and received between the generator-motor and the electric storage device;
a temperature detector which determines a temperature of the electric storage device;
an unload valve provided in the fluid path between a discharge port of the hydraulic pump and a tank, the unload valve configured to be opened to permit the hydraulic fluid from the hydraulic pump to flow to the tank via the fluid path and configured to be closed to shut off the fluid path;
an unload-valve control device which controls opening and closing of the unload valve; and
a relief valve provided between the discharge port of the hydraulic pump and the tank and having a predetermined set pressure, wherein
the power control device controls an electric power to be supplied from the electric storage device to the generator-motor, under abnormal circumstances where a temperature of the electric storage device is lower than a predetermined set temperature, to a power obtained by adding an additional discharge power to a power to be supplied under normal circumstances,
the unload-valve control device closes the unload valve to increase discharge pressure of the hydraulic pump to the set pressure of the relief valve when the electric storage device is discharging and opens the unload valve to permit the hydraulic fluid discharged from the hydraulic pump to flow to the tank via the fluid path separately from the relief valve when the electric storage device is not discharging, under the abnormal circumstances; and
the relief valve controls a discharge pressure of the pump so as to make the discharge pressure be the set pressure when the unload valve is closed under the abnormal circumstances.

2. The hybrid construction machine according to claim 1, wherein:
the hydraulic pump is a variable displacement pump;
the hybrid construction machine further comprises a pump discharge pressure detector which determines a discharge pressure of the hydraulic pump, a pump rotational speed detector which determines a rotational speed of the hydraulic pump, a pump-discharge-displacement control device which controls a discharge displacement of the hydraulic pump, a pump-discharge-displacement calculation section, and a generator-motor-power calculation section which calculates a motive power of the generator-motor on the basis of an electric power which is controlled by the power control device;
the generator-motor-power calculation section calculates a generator-motor additional power which is a motive power of the generator-motor corresponding to the additional discharge power;
the pump power calculation section calculates a pump additional power which is a motive power of the hydraulic pump corresponding to the generator-motor additional power;
the pump power calculation section calculates an additional discharge displacement which is a discharge displacement of the hydraulic pump required for adding to motive power of the hydraulic pump an amount corresponding to the pump additional power; and
the pump-discharge-displacement control device controls the discharge displacement of the hydraulic pump on the basis of the additional discharge displacement.

3. The hybrid construction machine according to claim 1, further comprising an actuator which is operated by supply of hydraulic fluid discharged by the hydraulic pump, an operation device which is operated in order to move the actuator, and an operation-state detector which detects whether or not the operation device is operated, wherein the power control device carries out the addition of the additional discharge power only when the operation-state detector determines that the operation device is not operated.

4. The hybrid construction machine according to claim 1, further comprising
- a charge rate detector which determines a charge rate of the electric storage device, wherein the power control device controls an electric power to be supplied from the generator-motor to the electric storage device, under the abnormal circumstances, to a power obtained by adding an additional charge power to a power to be supplied under normal circumstances;
- the power control device restricts the addition of the additional charge power when the charge rate is higher than a predetermined charge limit set value; and
- the power control device restricts the addition of the additional discharge power when the charge rate is lower than a predetermined discharge limit set value.

5. The hybrid construction machine according to claim 1, further comprising a heater disposed about the electric storage device, wherein
- the power control device controls an electric power to be supplied from the generator-motor to the electric storage device, under the abnormal circumstances, to a power obtained by adding an additional charge power to a power to be supplied under normal circumstances; and
- the heater is operated by electric power supplied from the electric storage device when the additional discharge power is supplied from the electric storage device to the generator-motor, and is operated by electric power supplied from the generator-motor when the additional charge power is supplied from the generator-motor to the electric storage device.

* * * * *